US008604728B2

(12) United States Patent
Liberatore et al.

(10) Patent No.: US 8,604,728 B2
(45) Date of Patent: Dec. 10, 2013

(54) METHOD AND APPARATUS FOR CONTROLLING DYNAMIC BRAKING ON LOCOMOTIVES

(75) Inventors: Aldo Liberatore, London (CA); Viktor Gvelesiani, London (CA)

(73) Assignee: Trac Rail Inc., London (CA)

( * ) Notice: Subject to any disclaimer, the term of this patent is extended or adjusted under 35 U.S.C. 154(b) by 211 days.

(21) Appl. No.: 13/206,356

(22) Filed: Aug. 9, 2011

(65) Prior Publication Data

US 2012/0286707 A1 Nov. 15, 2012

Related U.S. Application Data

(60) Provisional application No. 61/484,843, filed on May 11, 2011.

(51) Int. Cl.
*H02P 3/00* (2006.01)
*H02P 3/12* (2006.01)
*H02P 3/22* (2006.01)

(52) U.S. Cl.
USPC ........... 318/375; 318/273; 318/362; 318/380; 318/508; 307/11; 323/364; 338/48; 338/49; 338/50; 338/92; 338/215

(58) Field of Classification Search
USPC ........... 318/375, 87, 373, 759, 703, 757, 273, 318/362, 380, 508; 105/49, 61; 180/65.31, 180/65.8, 65.1, 60; 188/159, 267; 310/93, 310/67, 77; 323/364; 307/11; 338/48, 49, 338/50, 92, 215
See application file for complete search history.

(56) References Cited

U.S. PATENT DOCUMENTS

| | | | | |
|---|---|---|---|---|
| 3,967,171 A * | 6/1976 | Friend et al. | | 318/158 |
| 3,974,429 A * | 8/1976 | Friend et al. | | 388/806 |
| 4,284,936 A * | 8/1981 | Bailey et al. | | 318/381 |
| 4,896,090 A * | 1/1990 | Balch et al. | | 318/52 |
| 5,041,772 A * | 8/1991 | Earleson et al. | | 318/375 |
| 5,517,093 A * | 5/1996 | Augustyniak et al. | | 318/63 |
| 5,992,950 A * | 11/1999 | Kumar et al. | | 303/151 |
| 6,813,583 B2 * | 11/2004 | Kumar et al. | | 702/148 |
| 7,185,591 B2 * | 3/2007 | Kumar et al. | | 105/35 |
| 8,237,384 B2 * | 8/2012 | Tarnow et al. | | 318/375 |
| 2010/0330875 A1 * | 12/2010 | Severson | | 446/454 |

OTHER PUBLICATIONS

"Dynamic Braking System"; Extract from GE Manual for Locomotive Systems Operation, SMI-07001; publication date unknown.

(Continued)

*Primary Examiner* — Rita Leykin
(74) *Attorney, Agent, or Firm* — Brett J. Slaney; Blake, Cassels & Graydon LLP

(57) ABSTRACT

A system and method are provided for controlling a locomotive such that the braking effort is maintained at its optimal maximum level throughout the extended range. The method comprises detecting a first reduction in speed of the locomotive; energizing at least one solid state device connected across one or more grid resistors for a first predetermined amount of time to divert current away from the one or more grid resistors for the first predetermined amount of time; and de-energizing the solid state device after the first predetermined amount of time. The solid state device may be an Isolated Gate Bipolar Transistor (IGBT) and a plurality of solid state devices are energized, each solid state device being connected across a corresponding resistor grid.

24 Claims, 18 Drawing Sheets

(56) References Cited

OTHER PUBLICATIONS

GM Electro-Motive Locomotive Service Manual; "Dynamic Braking System Excitation and Control"; Section 7, Part D Introduction; publication date unknown.

GM Electro-Motive Locomotive Service Manual; "Extended Range Dynamic Brake Module, DE, (Special Order)"; Section 7, Part D—DE12; publication date unknown.

* cited by examiner

FIG. 11A

Existing Extended Range (from OEM charts)

| MPH | Grid 1 Current | Grid 1 Resistance | Grid 2 Current | Grid 2 Resistance | Grid 3 Current | Grid 3 Resistance | Grid 4 Current | Grid 4 Resistance | Braking Effort per TM | Total BE |
|---|---|---|---|---|---|---|---|---|---|---|
| 30.0 | 700 | 0.43 | 700 | 0.43 | 700 | 0.43 | 700 | 0.43 | 8000 | 48000 |
| 29.5 | 700 | 0.43 | 700 | 0.43 | 700 | 0.43 | 700 | 0.43 | 8050 | 48300 |
| 29.0 | 700 | 0.43 | 700 | 0.43 | 700 | 0.43 | 700 | 0.43 | 8100 | 48600 |
| 28.5 | 700 | 0.43 | 700 | 0.43 | 700 | 0.43 | 700 | 0.43 | 8170 | 49020 |
| 28.0 | 700 | 0.43 | 700 | 0.43 | 700 | 0.43 | 700 | 0.43 | 8230 | 49380 |
| 27.5 | 700 | 0.43 | 700 | 0.43 | 700 | 0.43 | 700 | 0.43 | 8320 | 49920 |
| 27.0 | 700 | 0.43 | 700 | 0.43 | 700 | 0.43 | 700 | 0.43 | 8450 | 50700 |
| 26.5 | 700 | 0.43 | 700 | 0.43 | 700 | 0.43 | 700 | 0.43 | 8580 | 51480 |
| 26.0 | 700 | 0.43 | 700 | 0.43 | 700 | 0.43 | 700 | 0.43 | 8690 | 52140 |
| 25.5 | 700 | 0.43 | 700 | 0.43 | 700 | 0.43 | 700 | 0.43 | 8900 | 53400 |
| 25.0 | 700 | 0.43 | 700 | 0.43 | 700 | 0.43 | 700 | 0.43 | 9290 | 55740 |
| 24.5 | 700 | 0.43 | 700 | 0.43 | 700 | 0.43 | 700 | 0.43 | 9800 | 58800 |
| 24.0 | 691 | 0.43 | 691 | 0.43 | 691 | 0.43 | 691 | 0.43 | 9750 | 58500 |
| 23.5 | 679 | 0.43 | 679 | 0.43 | 679 | 0.43 | 679 | 0.43 | 9530 | 57180 |
| 23.0 | 666 | 0.43 | 666 | 0.43 | 666 | 0.43 | 666 | 0.43 | 9330 | 55980 |
| 22.5 | 650 | 0.43 | 650 | 0.43 | 650 | 0.43 | 650 | 0.43 | 9180 | 55080 |
| 22.0 | 638 | 0.43 | 638 | 0.43 | 638 | 0.43 | 638 | 0.43 | 9000 | 54000 |
| 21.5 | 622 | 0.43 | 622 | 0.43 | 622 | 0.43 | 622 | 0.43 | 8800 | 52800 |
| 21.0 | 610 | 0.43 | 610 | 0.43 | 610 | 0.43 | 610 | 0.43 | 8690 | 52140 |
| 20.5 | 700 | 0 | 700 | 0.43 | 700 | 0.43 | 700 | 0.43 | 8850 | 53100 |
| 20.0 | 700 | 0 | 700 | 0.43 | 700 | 0.43 | 700 | 0.43 | 9100 | 54600 |
| 19.5 | 700 | 0 | 700 | 0.43 | 700 | 0.43 | 700 | 0.43 | 9350 | 56100 |
| 19.0 | 700 | 0 | 700 | 0.43 | 700 | 0.43 | 700 | 0.43 | 9610 | 57660 |
| 18.5 | 700 | 0 | 700 | 0.43 | 700 | 0.43 | 700 | 0.43 | 9900 | 59400 |
| 18.0 | 680 | 0 | 680 | 0.43 | 680 | 0.43 | 680 | 0.43 | 9626 | 57756 |
| 17.5 | 660 | 0 | 660 | 0.43 | 660 | 0.43 | 660 | 0.43 | 9355 | 56130 |
| 17.0 | 640 | 0 | 640 | 0.43 | 640 | 0.43 | 640 | 0.43 | 9084 | 54504 |
| 16.5 | 620 | 0 | 620 | 0.43 | 620 | 0.43 | 620 | 0.43 | 8813 | 52878 |
| 16.0 | 600 | 0 | 600 | 0.43 | 600 | 0.43 | 600 | 0.43 | 8542 | 51252 |

Table 1 - Part A – 30 to 16 MPH

| | | | | | | | | | |
|---|---|---|---|---|---|---|---|---|---|
| 15.5 | 580 | 0 | 580 | 0.43 | 580 | 0.43 | 8271 | 49626 |
| 15.0 | 560 | 0 | 560 | 0.43 | 560 | 0.43 | 8000 | 48000 |
| 14.5 | 700 | 0 | 700 | 0 | 700 | 0.43 | 8360 | 50160 |
| 14.0 | 700 | 0 | 700 | 0 | 700 | 0.43 | 8720 | 52320 |
| 13.5 | 700 | 0 | 700 | 0 | 700 | 0.43 | 9080 | 54480 |
| 13.0 | 700 | 0 | 700 | 0 | 700 | 0.43 | 9440 | 56640 |
| 12.5 | 700 | 0 | 700 | 0 | 700 | 0.43 | 9800 | 58800 |
| 12.0 | 675 | 0 | 675 | 0 | 675 | 0.43 | 9400 | 56400 |
| 11.5 | 650 | 0 | 660 | 0 | 660 | 0.43 | 9000 | 54000 |
| 11.0 | 625 | 0 | 625 | 0 | 625 | 0.43 | 8600 | 51600 |
| 10.5 | 597 | 0 | 597 | 0 | 597 | 0.43 | 8132 | 48792 |
| 10.0 | 565 | 0 | 565 | 0 | 565 | 0.43 | 7716 | 46296 |
| 9.5 | 540 | 0 | 540 | 0 | 540 | 0.43 | 7400 | 44400 |
| 9.0 | 510 | 0 | 510 | 0 | 510 | 0.43 | 7300 | 43800 |
| 8.5 | 700 | 0 | 700 | 0 | 700 | 0.43 | 7200 | 43200 |
| 8.0 | 700 | 0 | 700 | 0 | 700 | 0.43 | 7850 | 47100 |
| 7.5 | 700 | 0 | 700 | 0 | 700 | 0.43 | 8500 | 51000 |
| 7.0 | 700 | 0 | 700 | 0 | 700 | 0.43 | 9150 | 54900 |
| 6.5 | 700 | 0 | 700 | 0 | 700 | 0.43 | 9800 | 58800 |
| 6.0 | 647 | 0 | 647 | 0 | 647 | 0.43 | 8730 | 52380 |
| 5.5 | 590 | 0 | 590 | 0 | 590 | 0.43 | 8015 | 48090 |
| 5.0 | 540 | 0 | 540 | 0 | 540 | 0.43 | 7300 | 43800 |
| 4.5 | 480 | 0 | 480 | 0 | 480 | 0.43 | 6435 | 38610 |
| 4.0 | 430 | 0 | 430 | 0 | 430 | 0.43 | 5720 | 34320 |
| 3.5 | 370 | 0 | 370 | 0 | 370 | 0.43 | 5005 | 30030 |
| 3.0 | 320 | 0 | 320 | 0 | 320 | 0.43 | 4290 | 25740 |
| 2.5 | 260 | 0 | 260 | 0 | 260 | 0.43 | 3575 | 21450 |
| 2.0 | 210 | 0 | 210 | 0 | 210 | 0.43 | 2860 | 17160 |
| 1.5 | 150 | 0 | 150 | 0 | 150 | 0.43 | 2145 | 12870 |
| 1.0 | 100 | 0 | 100 | 0 | 100 | 0.43 | 1430 | 8580 |
| 0.5 | 50 | 0 | 50 | 0 | 50 | 0.43 | 715 | 4290 |

Table 1 - Part B – 15.5 to 0.5 MPH

FIG. 11B

Calculated IGBT Based Extended Range

| MPH | Grid 1,2,3 | | | Grid 4 | | | PWM | Total BE (calc) |
|---|---|---|---|---|---|---|---|---|
| | Current | Resistance | volts | Current | Resistance | volts | | |
| 30.0 | 700 | 1.29 | 903 | 700 | 0.43 | 301 | 0.0% | 48040 |
| 29.5 | 700 | 1.29 | 903 | 700 | 0.43 | 301 | 0.0% | 48864 |
| 29.0 | 700 | 1.29 | 903 | 700 | 0.43 | 301 | 0.0% | 49696 |
| 28.5 | 700 | 1.29 | 903 | 700 | 0.43 | 301 | 0.0% | 50568 |
| 28.0 | 700 | 1.29 | 903 | 700 | 0.43 | 301 | 0.0% | 51471 |
| 27.5 | 700 | 1.29 | 903 | 700 | 0.43 | 301 | 0.0% | 52407 |
| 27.0 | 700 | 1.29 | 903 | 700 | 0.43 | 301 | 0.0% | 53377 |
| 26.5 | 700 | 1.29 | 903 | 700 | 0.43 | 301 | 0.0% | 54384 |
| 26.0 | 700 | 1.29 | 903 | 700 | 0.43 | 301 | 0.0% | 55430 |
| 25.5 | 700 | 1.29 | 903 | 700 | 0.43 | 301 | 0.0% | 56517 |
| 25.0 | 700 | 1.29 | 903 | 700 | 0.43 | 301 | 0.0% | 57648 |
| 24.5 | 700 | 1.29 | 903 | 700 | 0.43 | 301 | 0.0% | 56824 |
| 24.0 | 691 | 1.29 | 891 | 700 | 0.43 | 301 | 1.3% | 56899 |
| 23.5 | 681 | 1.29 | 878 | 700 | 0.43 | 301 | 2.7% | 56864 |
| 23.0 | 671 | 1.29 | 866 | 700 | 0.43 | 301 | 4.1% | 56847 |
| 22.5 | 661 | 1.29 | 853 | 700 | 0.43 | 301 | 5.6% | 56849 |
| 22.0 | 651 | 1.29 | 840 | 700 | 0.43 | 301 | 7.0% | 56871 |
| 21.5 | 640 | 1.29 | 826 | 700 | 0.43 | 301 | 8.6% | 56783 |
| 21.0 | 630 | 1.29 | 813 | 700 | 0.43 | 301 | 10.0% | 56849 |
| 20.5 | 619 | 1.29 | 799 | 700 | 0.43 | 301 | 11.6% | 56805 |
| 20.0 | 608 | 1.29 | 784 | 700 | 0.43 | 301 | 13.1% | 56787 |
| 19.5 | 597 | 1.29 | 770 | 700 | 0.43 | 301 | 14.7% | 56795 |
| 19.0 | 586 | 1.29 | 756 | 700 | 0.43 | 301 | 16.3% | 56831 |
| 18.5 | 575 | 1.29 | 742 | 700 | 0.43 | 301 | 17.9% | 56899 |
| 18.0 | 563 | 1.29 | 726 | 700 | 0.43 | 301 | 19.6% | 56861 |
| 17.5 | 551 | 1.29 | 711 | 700 | 0.43 | 301 | 21.3% | 56858 |
| 17.0 | 539 | 1.29 | 695 | 700 | 0.43 | 301 | 23.0% | 56892 |
| 16.5 | 526 | 1.29 | 679 | 700 | 0.43 | 301 | 24.9% | 56625 |
| 16.0 | 513 | 1.29 | 662 | 700 | 0.43 | 301 | 26.7% | 56801 |

Table 2 - Part A – 30 to 16 MPH

FIG. 12A

| | | | | | | | | |
|---|---|---|---|---|---|---|---|---|
| 15.5 | 500 | 1.29 | 645 | 700 | 0.43 | 301 | 28.6% | 58824 |
| 15.0 | 486 | 1.29 | 627 | 700 | 0.43 | 301 | 30.6% | 58755 |
| 14.5 | 473 | 1.29 | 610 | 700 | 0.43 | 301 | 32.4% | 58884 |
| 14.0 | 458 | 1.29 | 591 | 700 | 0.43 | 301 | 34.6% | 58787 |
| 13.5 | 443 | 1.29 | 571 | 700 | 0.43 | 301 | 36.7% | 58756 |
| 13.0 | 428 | 1.29 | 552 | 700 | 0.43 | 301 | 38.9% | 58799 |
| 12.5 | 412 | 1.29 | 531 | 700 | 0.43 | 301 | 41.1% | 58779 |
| 12.0 | 396 | 1.29 | 511 | 700 | 0.43 | 301 | 43.4% | 58851 |
| 11.5 | 379 | 1.29 | 489 | 700 | 0.43 | 301 | 45.9% | 58883 |
| 11.0 | 361 | 1.29 | 466 | 700 | 0.43 | 301 | 48.4% | 58886 |
| 10.5 | 342 | 1.29 | 441 | 700 | 0.43 | 301 | 51.1% | 58760 |
| 10.0 | 321 | 1.29 | 414 | 700 | 0.43 | 301 | 54.1% | 58824 |
| 9.5 | 300 | 1.29 | 387 | 700 | 0.43 | 301 | 57.1% | 58839 |
| 9.0 | 277 | 1.29 | 357 | 700 | 0.43 | 301 | 60.4% | 58868 |
| 8.5 | 252 | 1.29 | 325 | 700 | 0.43 | 301 | 64.0% | 58873 |
| 8.0 | 224 | 1.29 | 289 | 700 | 0.43 | 301 | 68.0% | 58882 |
| 7.5 | 192 | 1.29 | 248 | 700 | 0.43 | 301 | 72.6% | 58848 |
| 7.0 | 153 | 1.29 | 197 | 700 | 0.43 | 301 | 78.1% | 58824 |
| 6.5 | 100 | 1.29 | 129 | 700 | 0.43 | 301 | 85.7% | 51301 |
| 6.0 | 0 | 1.29 | 0 | 647 | 0.43 | 278 | 100.0% | 46538 |
| 5.5 | 0 | 1.29 | 0 | 590 | 0.43 | 254 | 100.0% | 42083 |
| 5.0 | 0 | 1.29 | 0 | 540 | 0.43 | 232 | 100.0% | 37647 |
| 4.5 | 0 | 1.29 | 0 | 480 | 0.43 | 206 | 100.0% | 33989 |
| 4.0 | 0 | 1.29 | 0 | 430 | 0.43 | 185 | 100.0% | 28761 |
| 3.5 | 0 | 1.29 | 0 | 370 | 0.43 | 159 | 100.0% | 25098 |
| 3.0 | 0 | 1.29 | 0 | 320 | 0.43 | 138 | 100.0% | 19883 |
| 2.5 | 0 | 1.29 | 0 | 260 | 0.43 | 112 | 100.0% | 16213 |
| 2.0 | 0 | 1.29 | 0 | 210 | 0.43 | 90 | 100.0% | 11030 |
| 1.5 | 0 | 1.29 | 0 | 150 | 0.43 | 65 | 100.0% | 7353 |
| 1.0 | 0 | 1.29 | 0 | 100 | 0.43 | 43 | 100.0% | 3677 |
| 0.5 | 0 | 1.29 | 0 | 50 | 0.43 | 22 | 100.0% | |

Table 2 - Part B – 15.5 to 0.5 MPH

FIG. 12B

METHOD AND APPARATUS FOR CONTROLLING DYNAMIC BRAKING ON LOCOMOTIVES

This application claims priority from U.S. Provisional Patent Application No. 61/484,843 filed on May 11, 2011, the entire contents of which is incorporated herein by reference.

TECHNICAL FIELD

The following relates to methods and apparatus for controlling dynamic braking on locomotives.

BACKGROUND

Large traction vehicles such as locomotives are typically powered by DC electric traction motors coupled to axles of the vehicle. For example, a locomotive commonly has four or six wheel and axle sets per vehicle, with each set being connected via appropriate gearing to the drive shaft of an electric motor, referred to in the art as a traction motor. Traction motors, when operable, are supplied with electric power from a controlled source, commonly a traction alternator driven by the locomotive's engine. The traction motors apply torque to the locomotive's wheels, which in turn exert tractive effort on the rails on which the locomotive is travelling. The DC traction motors can also be reconfigured to apply braking effort which is then used to either control speed or to reduce speed when stopping, i.e. to perform braking. This function is referred to as dynamic braking.

Many diesel electric locomotives in operation today are equipped with dynamic braking, whereby the locomotive's traction motors, primarily used to power its wheels, are reconfigured to become generators used to slow the locomotive down when braking is required. As the locomotive slows down below a critical speed, the braking effort of the traction motor is reduced to the point where it becomes ineffective. A traditional method of overcoming this outcome is to short out portions of the braking resistors, allowing the current to rise, thereby increasing braking effort. During the transition of shorting out portions of the dynamic braking grid, there is a temporary reduction of braking effort. At certain speeds, due to the specific nature of the locomotive's control system, it has been found that there is a below optimum braking effort.

It is an object of the following to address the above-described disadvantages.

SUMMARY

North American freight locomotives are commonly equipped with dynamic brakes, a method of configuring and operating its traction motors such that they provide braking effort to the locomotive. Braking effort is a function of several parameters, including the locomotive's speed. Below a certain threshold, braking effort begins to deteriorate proportionally with the locomotive's speed to the point of becoming ineffective. To overcome this, commonly accepted technology uses contactors to reduce the loading on the traction motors resulting in an extended effective braking range. An undesirable result of this practice is that the braking effort now varies significantly with the speed of the locomotive.

In one aspect, there is provided a method for controlling a locomotive, the method comprising: detecting a change in speed of the locomotive during dynamic braking; energizing at least one solid state device connected across one or more grid resistors for a first predetermined amount of time to divert current away from the one or more grid resistors for the first predetermined amount of time; and de-energizing the solid state device after the first predetermined amount of time.

The method may further comprise detecting one or more additional changes in speed of the locomotive; and for each additional change in speed, energizing the solid state device for a respective amount of time, wherein each respective amount of time changes incrementally.

The detected changes in speed may be decreases in speed as the locomotive slows down, or increases in speed as the locomotive gains speed.

The solid state device, in at least one embodiment, may be an Isolated Gate Bipolar Transistor (IGBT).

A plurality of solid state devices may also be used to address wheel slide, each solid state device being connected across a corresponding resistor grid.

In another aspect, there is provided a computer readable medium comprising computer executable instructions for performing the above methods.

In yet another aspect, there is provided a locomotive control system for controlling a locomotive, the system comprising: a processor and memory, the memory storing computer executable instructions that when executed by the processor operate the locomotive control system by performing the methods discussed above.

BRIEF DESCRIPTION OF THE DRAWINGS

Embodiments will now be described by way of example only with reference to the appended drawings wherein:

FIG. 11 provides a table illustrating braking effort for a traditional extended range dynamic braking system.

FIG. 12 provides a table illustrating braking effort for a solid state device based extended range dynamic braking system.

DETAILED DESCRIPTION OF THE DRAWINGS

Figure 1:
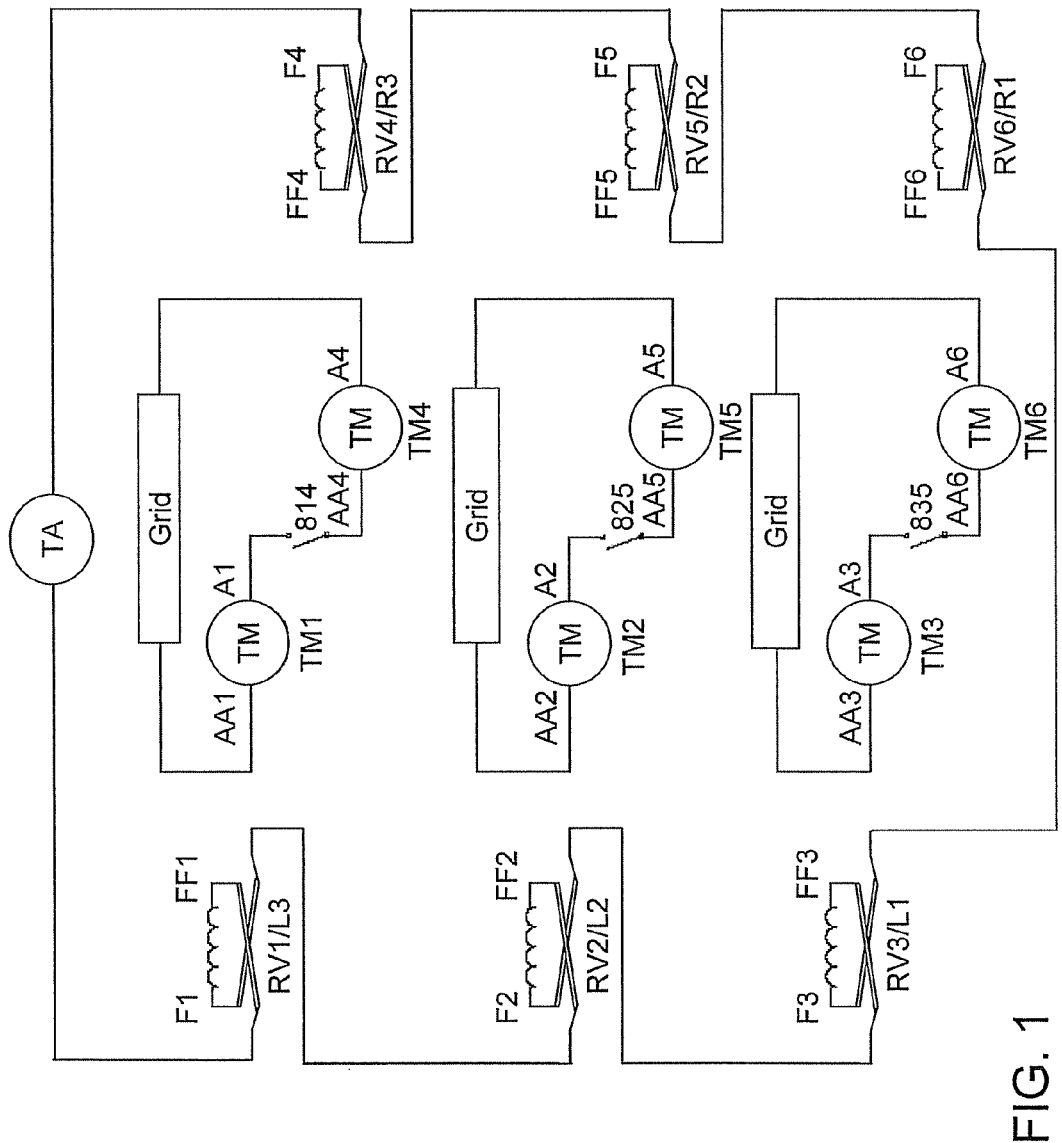
FIG. 1 is a schematic diagram showing traction motor field connections and traction motors connected across dynamic braking grid resistors.
Figure 2:
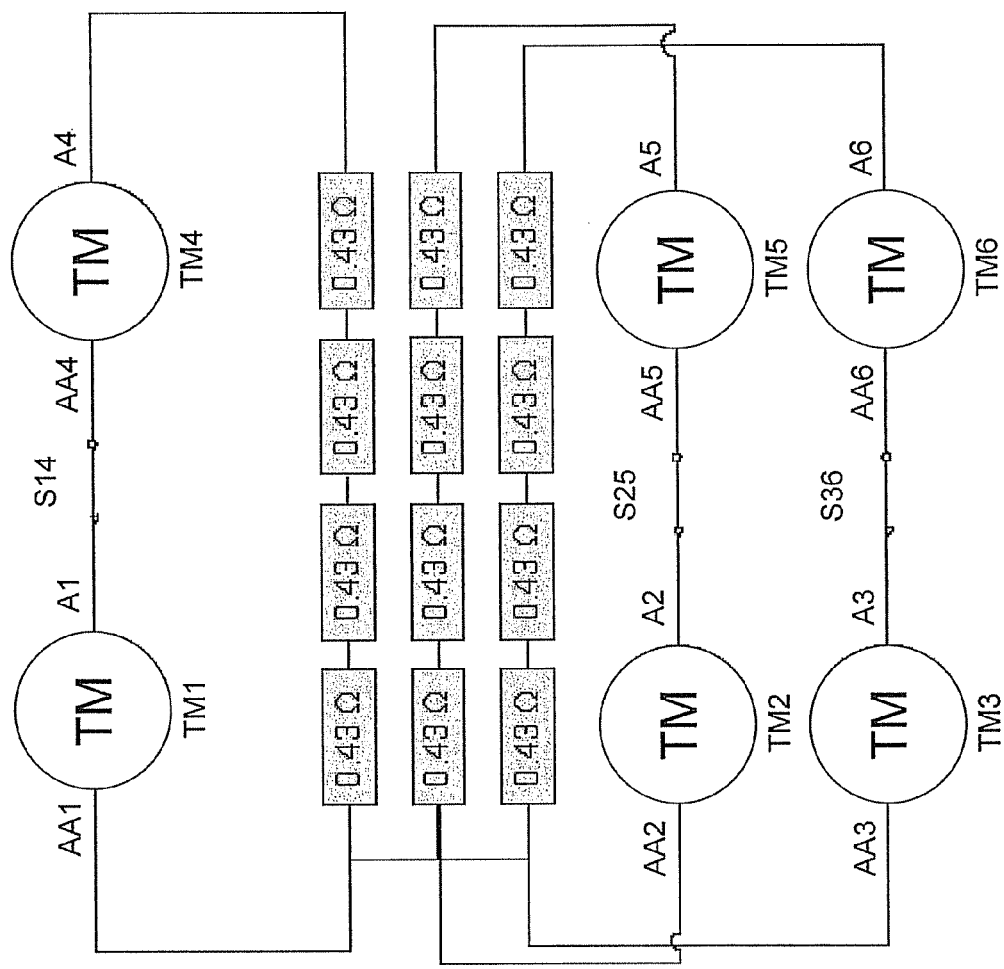
FIG. 2 is a schematic diagram showing traction motor armature connections for a locomotive equipped with basic dynamic brakes.
Figure 3:
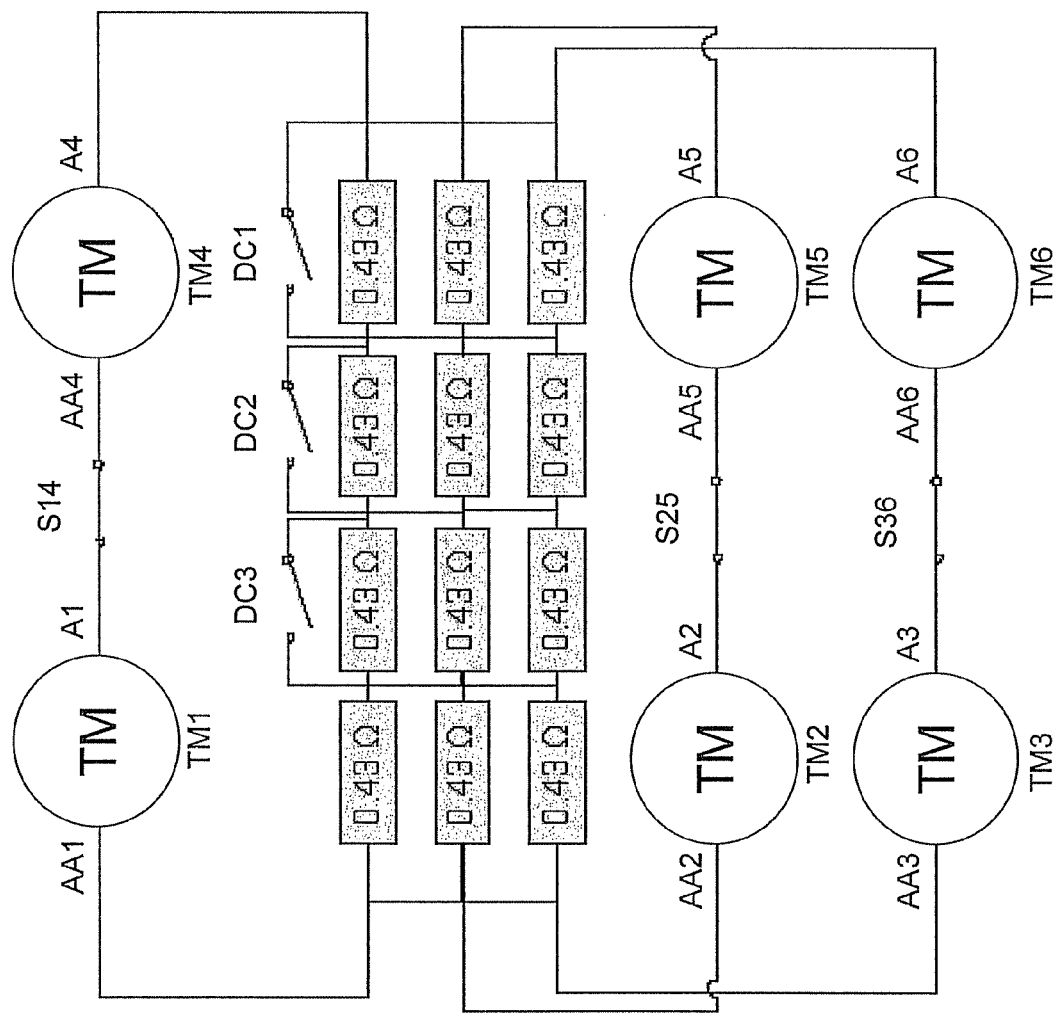
FIG. 3 is a schematic diagram showing traction motor armature connections for a locomotive equipped with extended range dynamic brakes.

Locomotive dynamic braking systems are used to retard locomotive speed through the conversion of kinetic energy to electrical energy. Such energy conversion is accomplished by connecting the traction motors as separately excited generators with the field excitation current being provided by the main generator. The traction motor armature is coupled to the locomotive's axle through gears and will rotate whenever the locomotive is moving. The load for the traction motor is provided by connecting the traction motor armature circuits to load resistors commonly referred to as dynamic braking grids. The grid current (i.e. armature current) is determined based on the speed at which the armatures rotate (proportional to the locomotive's track speed) and the amount of excitation applied to the motor fields. A schematic diagram of traction motor field connections is shown in FIG. 1, and traction motor armature connections for a locomotive equipped with basic dynamic brakes and extended range dynamic brakes are shown in FIGS. 2 and 3 respectively.

Figure 4:
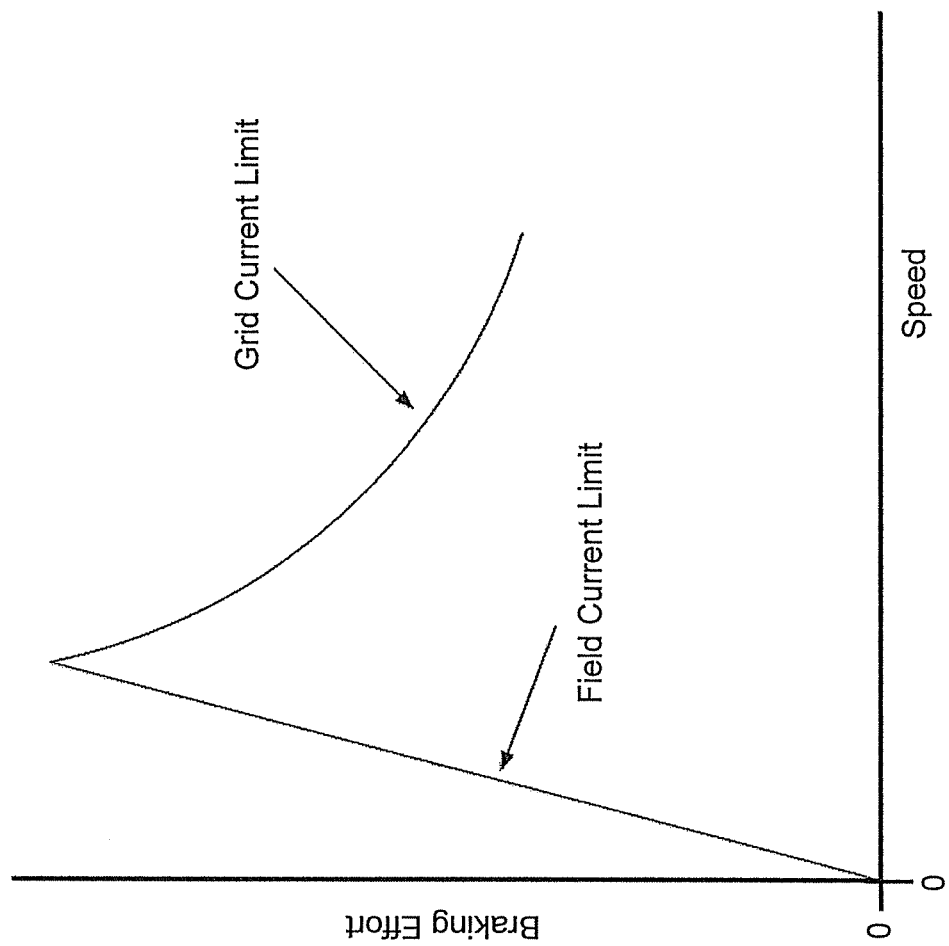
FIG. 4 is a chart illustrating braking effort of a locomotive versus speed.

FIG. 4 shows the braking effort that can be derived by a traction motor. As can be seen, there are three factors that determine how much braking effort is available to slow down the train: 1) traction motor field current, which provides the excitation for the traction motor armature to act as a generator; 2) locomotive speed, which is directly proportional to the armature's rotational velocity; and 3) grid current, which corresponds to the output of the traction motor armature. Traction motor field current is controlled by the operator. The higher the requirement for braking effort, the higher the current through the traction motor fields. There is a maximum allowable current based on the capacity and cooling requirements of the traction motor fields. In the example used here, this maximum is 975 amps. There is also a maximum allowable current that can be generated into the resistor grids and this is established by the system's ability to dissipate the heat that is being generated. In this example, grid current will not be allowed to exceed 700 amps. As can be seen, maximum braking effort is achieved where these two curves intersect.

The graph in FIG. 4 illustrates the braking effort parameters for a common locomotive model and shows the relationship between braking effort and locomotive track speed. In the example graph shown, with a maximum field excitation being approximately, for example, 975 amperes, with the operator asking for maximum braking effort, braking effort would increase from a minimum at zero miles per hour to a maximum at approximately 24 miles per hour. Maximum braking effort for the lower braking lever positions is progressively lower and is achieved at progressively higher track speeds as the braking lever position is decreased. After a maximum braking effort is attained, an increase in track speed results in a decrease in braking effort. However, high braking effort can be maintained at low track speeds on locomotives equipped with extended range dynamic braking systems. Further detail of such extended range systems will be provided below.

The amount of kinetic energy that is converted into electrical energy is proportional to $I^2R$, where I is the braking grid current and R is the resistance effectively created by the braking grids. The increase in braking effort from zero to the maximum is as a result of an increased traction motor armature grid current as track speed increases. This amounts to an increase of $I^2R$ and consequently an increase in braking horsepower, since horsepower is equal to $I^2R$ divided by 746. The grid current increases to its maximum value at the speed where maximum braking effort is attained and remains at the maximum value at all higher speeds. The decrease in braking effort at higher track speed may be explained as follows.

First, it may be noted that braking horsepower remains constant at the higher track speeds. Braking effort may be defined as the amount of retarding force in pounds that is applied to decrease the track speed. The horsepower formula often used in the rail industry is as follows: HP=tractive effort (lbs)*(speed (mph)/375)). The retarding force (braking effort) in pounds, may be substituted for tractive effort in the above formula: HP=braking effort (lbs)*(speed (mph)/375)). Since braking horsepower remains constant, the product of braking effort and speed must also remain constant. If speed increases, the retarding force or braking effort must decrease in order for braking horsepower to remain constant.

The excitation current to the traction motor fields is controlled by the braking lever position (controlled by the operator). Different locomotive models and generations use different electrical control designs but essentially, all perform the same function. The operator requests an amount of braking effort by moving the dynamic brake lever from position 1 (the lowest request) to position 8 (maximum available braking effort). A typical dynamic brake control system will supply the field current to the traction motor fields proportional to the position of the handle from minimum to maximum. Thus, at maximum, the system will drive 975 amps through the traction motor fields. At position 4, the system will drive 487 amps (approximately) through the fields. The resulting braking effort then becomes a function of the locomotive speed, which determines how much traction motor armature current is being forced through the resistor grids. If the grid current exceeds the maximum allowable limit of the grids (in this example 700 amps), the control system will reduce the field current, resulting in a reduction of armature current, to protect the grids and maintain a constant 700 amps.

Figure 6:
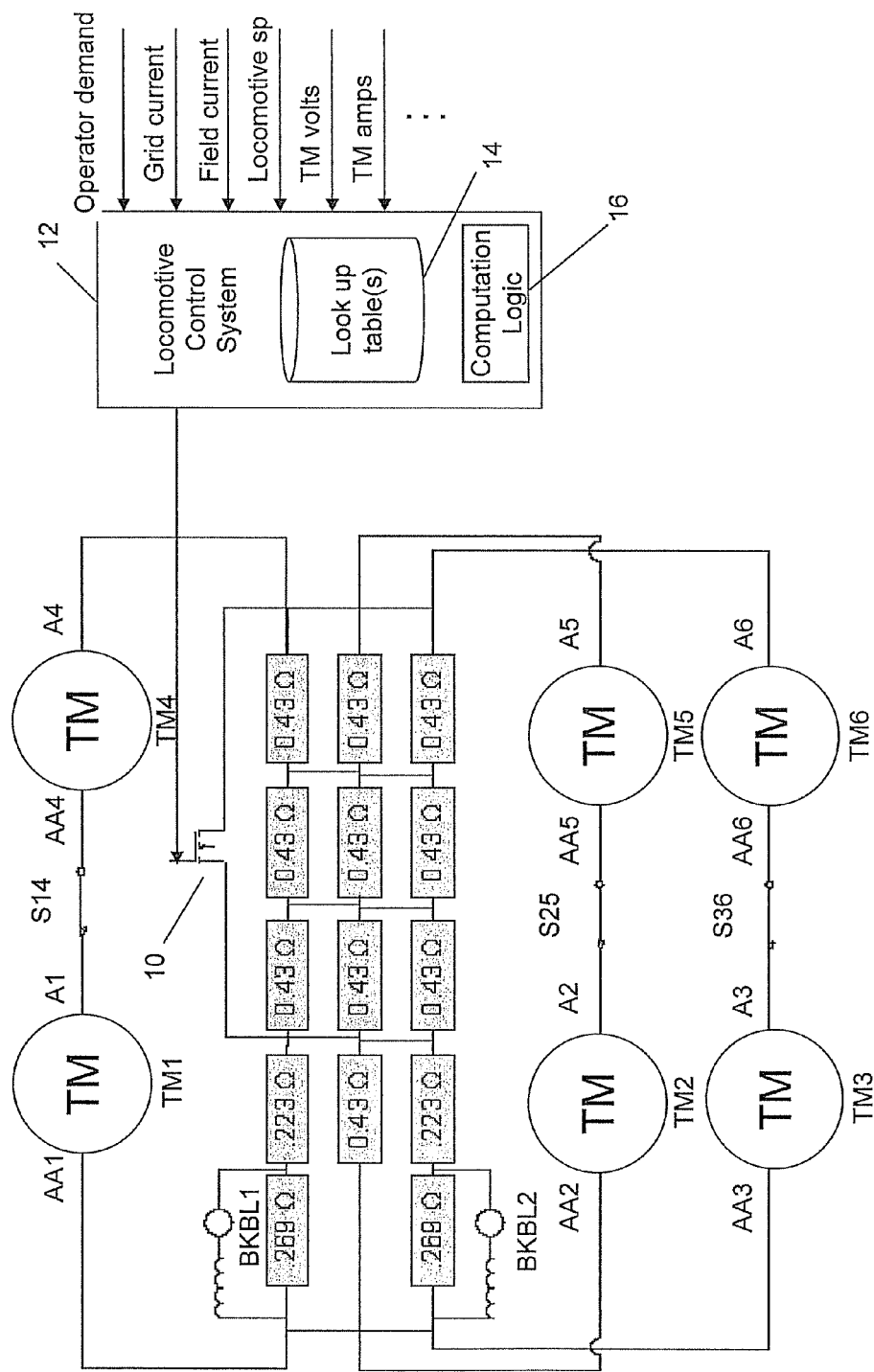
FIG. 6 is a schematic diagram showing traction motor armature connections configured for an extended range dynamic braking system using a solid state device.
Figure 16:
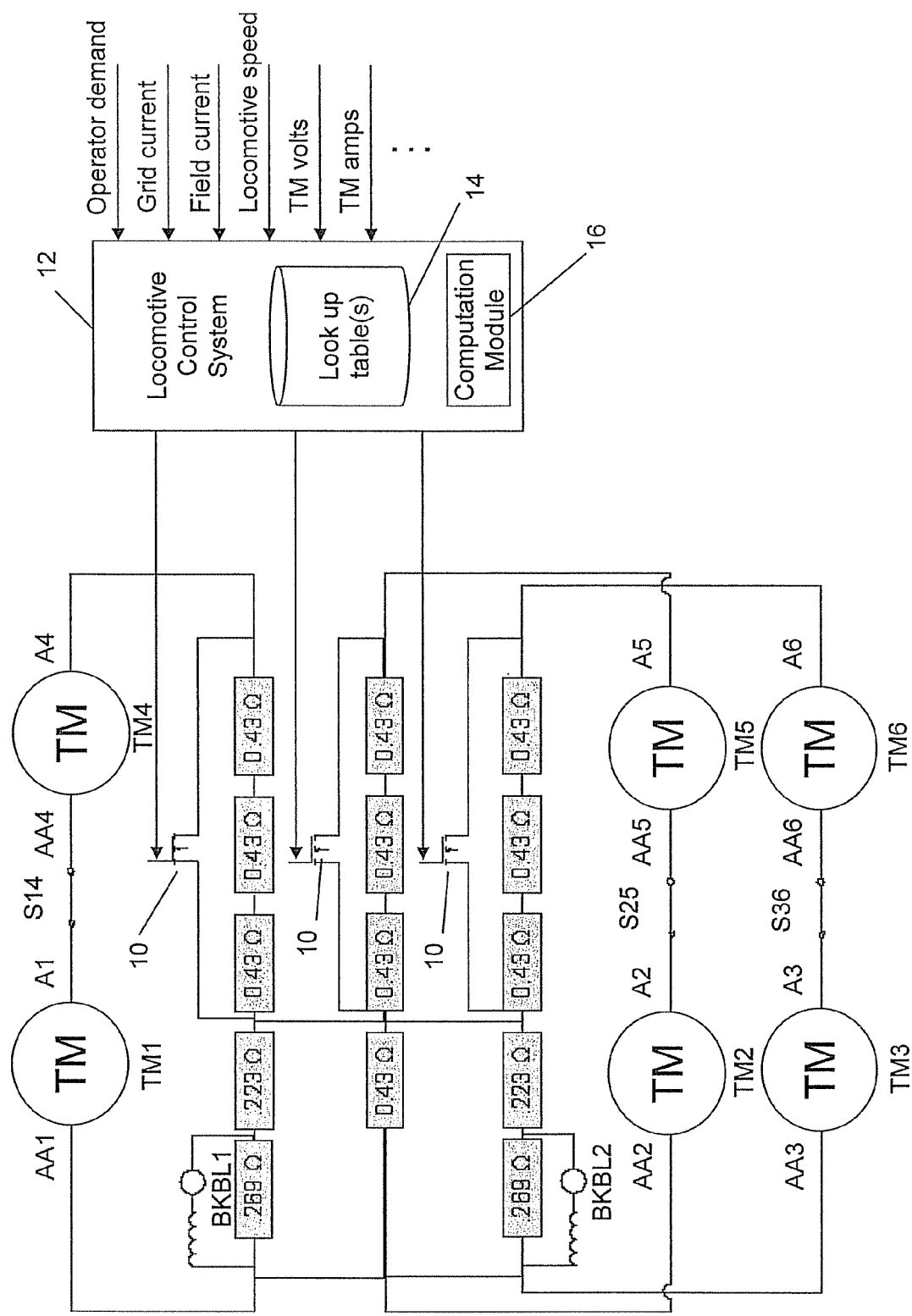
FIG. 16 is a schematic diagram showing traction motor armature connections configured for an extended range dynamic braking system using a solid state device for each of a plurality of resistor grids.

The braking grids are cooled by an exhaust blower to prevent overheating. The blower motor is electrically connected across a portion of one braking grid and is powered by current flowing through the grid. The blower, located above the grids, draws outside air through a grill, circulates it around the grids, and exhausts to atmosphere. Typical grid blower connections are shown in FIGS. 6 and 16.

On locomotives equipped with basic dynamic braking systems, as shown in FIG. 2, maximum braking effort normally drops off rapidly at track speeds. The actual speed that this drop off occurs varies with locomotive models. In this example, this occurs at 24 miles per hour.

To extend the effective range of a locomotive's dynamic brakes, sections of the resistor grids may be shorted out. By shorting out a section of the grid, the total resistance across the traction motor armature is reduced. Ohm's law dictates that given a constant voltage, as resistance drops, current rises by a proportional amount. Braking effort is proportional to $I^2R$. Thus, with all other conditions remaining the same, the braking effort is increased as the resistance drops.

The way the resistors are shorted out is by using contactors that close across sections of the resistor grid. This is shown in FIG. 3. As the locomotive continues to reduce speed there becomes another point where braking effort drops. At this time another shorting contactor is closed across another section of the resistor grid. This further reduces the resistance, increasing the current and thus the braking effort. With extended range brakes it is typical to find 3 stages of grid resistance being shorted.

Figure 5:
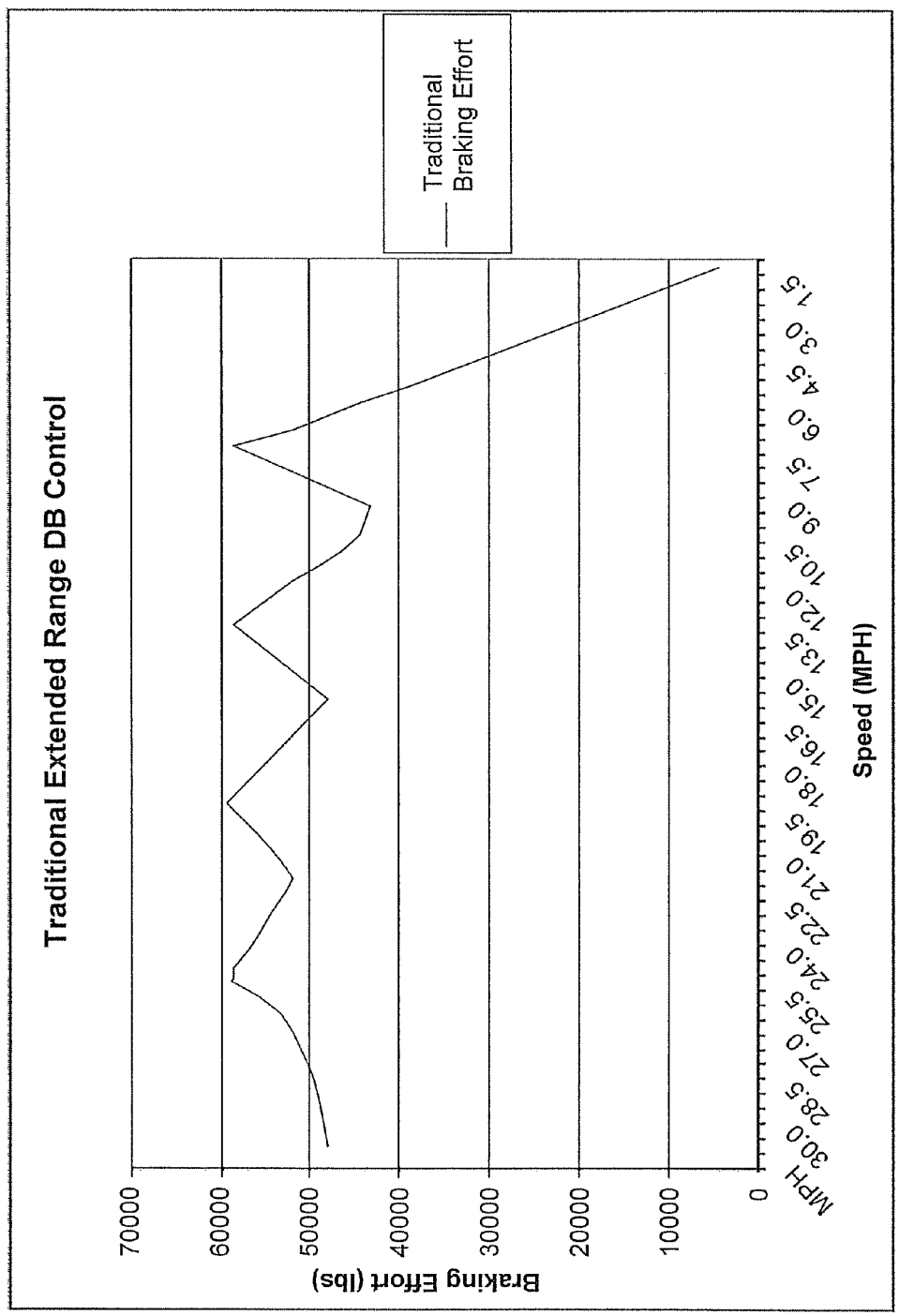
FIG. 5 is a chart illustrating braking effort versus speed for a traditional extended range dynamic braking system.

FIG. 5 shows how the braking effort is extended by the use of shorting contactors. As can be seen in this example, the effective range is extended to approximately 6 mph before the braking effort drops significantly.

Although the above-described extended range dynamic braking system can effectively increase braking effort for a longer period of time while reducing track speed, as noted above, during the transition of shorting out portions of the dynamic braking grid, there is a temporary reduction of braking effort. At certain speeds, due to the specific nature of the locomotive's control system, it has been found that there is a below optimum braking effort.

In order to address these shortcomings it has been recognized that the transition effect can be smoothed such that optimal braking effort is maintained throughout the effective range of the dynamic braking process.

As has been shown, the shorting out of sections of dynamic brake grid resistors is an effective way of extending the system's useful speed range. The undesirable aspect is the temporary loss of braking effort during transition steps of shorting the sections during speed reduction or re-instating the sections during speed increases. A solution to this undesirable characteristic is offered as follows.

Figure 7:
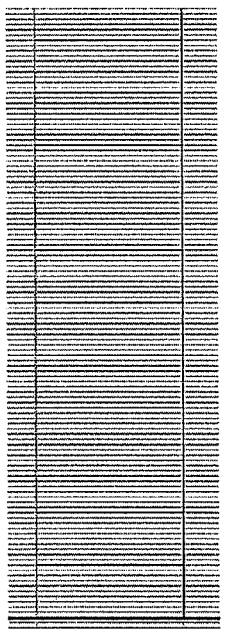
FIGS. 7 to 9 are charts illustrating pulse width modulation (PWM).
Figure 8:
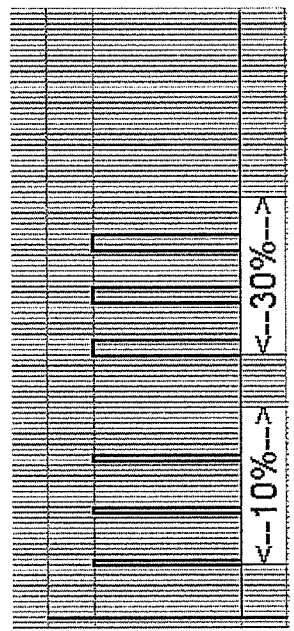
Figure 9:
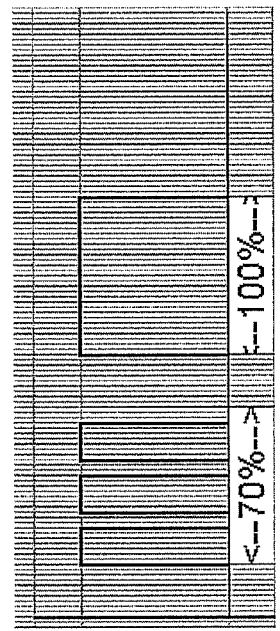

As can be seen in FIG. 6, the shorting contactors may be replaced by a single high power solid state device. A particularly suitable device in this example is an IGBT (Isolated Gate Bipolar Transistor) 10. Other technologies may be used with similar results. The IGBT 10 is a component controlled by a locomotive control system 12 which is configured for performing dynamic braking, and is turned on and off at a fixed frequency with varying pulse widths, such a technique of high speed control being commonly known as Pulse Width Modulation (PWM). PWM is illustrated in FIGS. 7-9, and is typically identified according to a percentage of the pulse that is on. FIG. 7 illustrates 1% PWM, FIG. 8 illustrates 10% and 30% PWM, and FIG. 9 illustrates 70% and 100% PWM.

Returning to FIG. 6, it can be seen that the locomotive control system 12 may store or otherwise have access to one or more look up tables 14, which can be referenced to control dynamic braking by adjusting pulse widths used during PWM control of the IGBT 10 (discussed in greater detail below). The locomotive control system 12 may instead store or otherwise have access to a computation module 16 providing instructions for calculating an IGBT firing cycle according to a detected speed during dynamic braking. Various inputs to the locomotive control system 10 are also shown, such as operator demand, grid current, field current, locomotive speed, traction motor $^{TM}$ volts, TM amps, etc. It can be appreciated that the locomotive speed input may be obtained in various ways. For example, an axle generator or similar device such as radar, GPS, etc. can be used to obtain a direct speed measurement. However, it will also be appreciated that the locomotive's speed can be derived indirectly from other measurements such as through an analysis of the traction motor's electrical parameters (i.e. TM volts, and TM amps).

Figure 10:
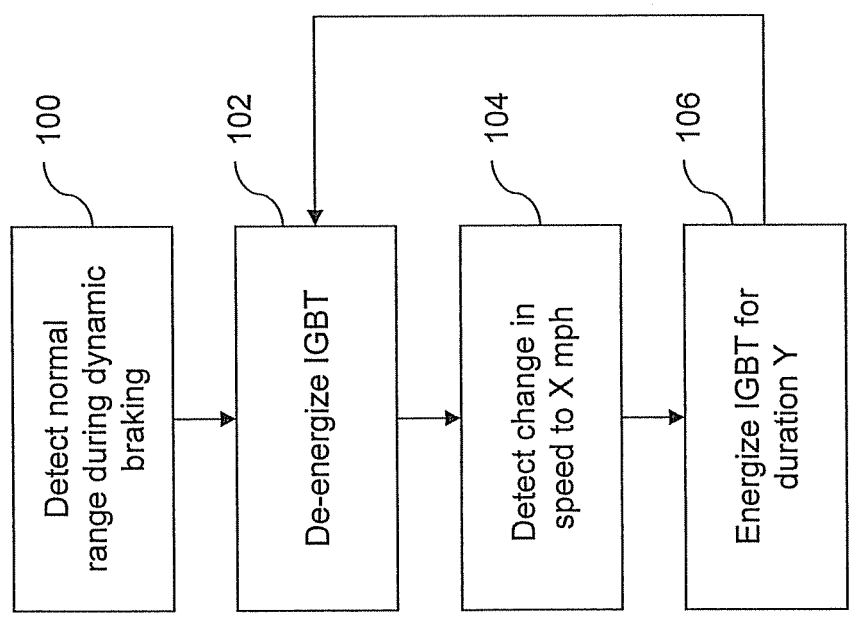
FIG. 10 is a flow chart illustrating an example set of computer executable operations that may be performed by a locomotive control system in operating an extended range dynamic braking system using a solid state device.

As shown in FIG. 10, normal dynamic braking occurs at 100 and the IGBT 10 is de-energizer or "off" at 102, mimicking the actions of the shorting contactors at this stage (de-energized and open circuit). As the locomotive changes speed at 104 (i.e. either a decrease or increase in speed is detected during dynamic braking), instead of the shorting contactor being energized and the grid resistance being reduced by a discrete amount X, the IGBT 10 is fired (i.e. turned on) for a short duration. During the period Y when the IGBT 10 is on at 106, current is diverted from the grid resistor section that it is placed across (e.g. the 0.43Ω resistors shown in FIG. 6). The IGBT 10 is then turned off at 102, again forcing all of the current through the grid resistor. Effectively, this is modifying the resistance of the grid resistor. As can be appreciated from the spikes in FIG. 5, this process may be repeated multiple times during braking, i.e. repeated as the locomotive continues to slow down (or speeds up if applicable). By being able to vary the width of the pulse at each iteration, the effective resistance is also modified, meaning that the braking effort can be controlled substantially infinitely versus the discrete steps that were necessary when physically shorting out the resistor grids. The frequency of the pulse should be fast enough that the heat dissipated in the resistor while the IGBT 10 is off during this type of control is averaged over the time that the current is diverted through the IGBT 10, thus not exceeding the specifications of the grid resistor. 500 Hz to 1 kHz has been found to be a suitable frequency for this purpose.

Table 1 in FIG. 11 shows the braking effort for a common locomotive traction motor derived from the manufacturer's published information. The current for each segment of the grid and the resistance is shown as well as the effect of shorting a grid segment has on the total braking effort.

Table 2 in FIG. 12 shows the braking effort resulting from the use of PWM control and it can be seen in Table 2 that the PWM pulse is widened as the speed decreases to thereby smooth out the transitions and avoid the temporary loss of braking effort when compared to the chart in FIG. 5. It can be appreciated that Table 2 in FIG. 12 can also be referenced in the opposite direction in order to apply the principles discussed herein as the locomotive's speed increases (e.g. during a change in grade).

Figure 13:
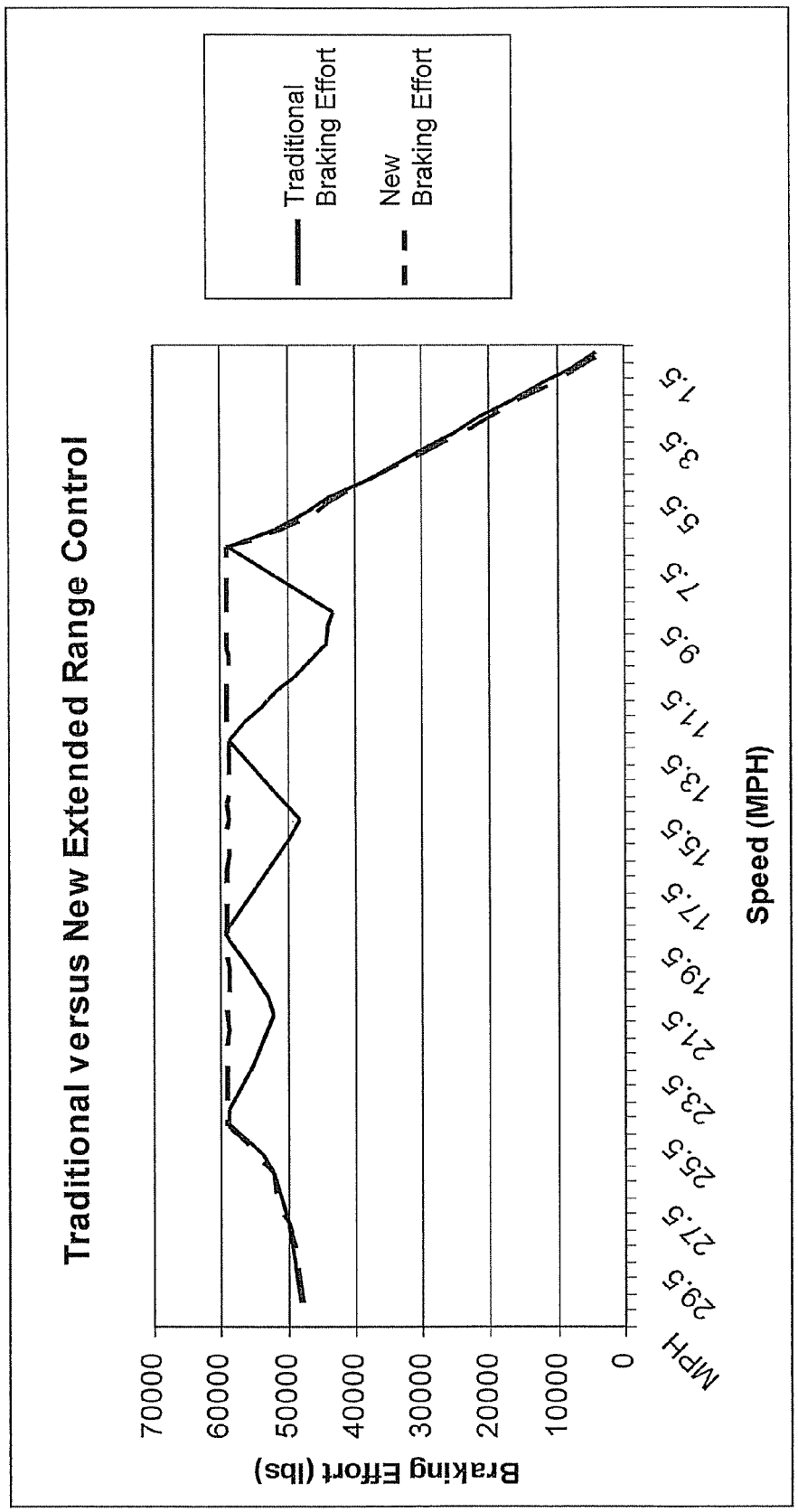
FIG. 13 is a chart illustrating braking effort versus speed for an extended range dynamic braking system using a solid state device.

FIG. 13 charts the data in Tables 1 and 2 against each other and shows the anticipated improvement, wherein it can be seen that the temporary losses of braking effort during each transition can be reduced or even eliminated throughout the braking process.

Figure 14:
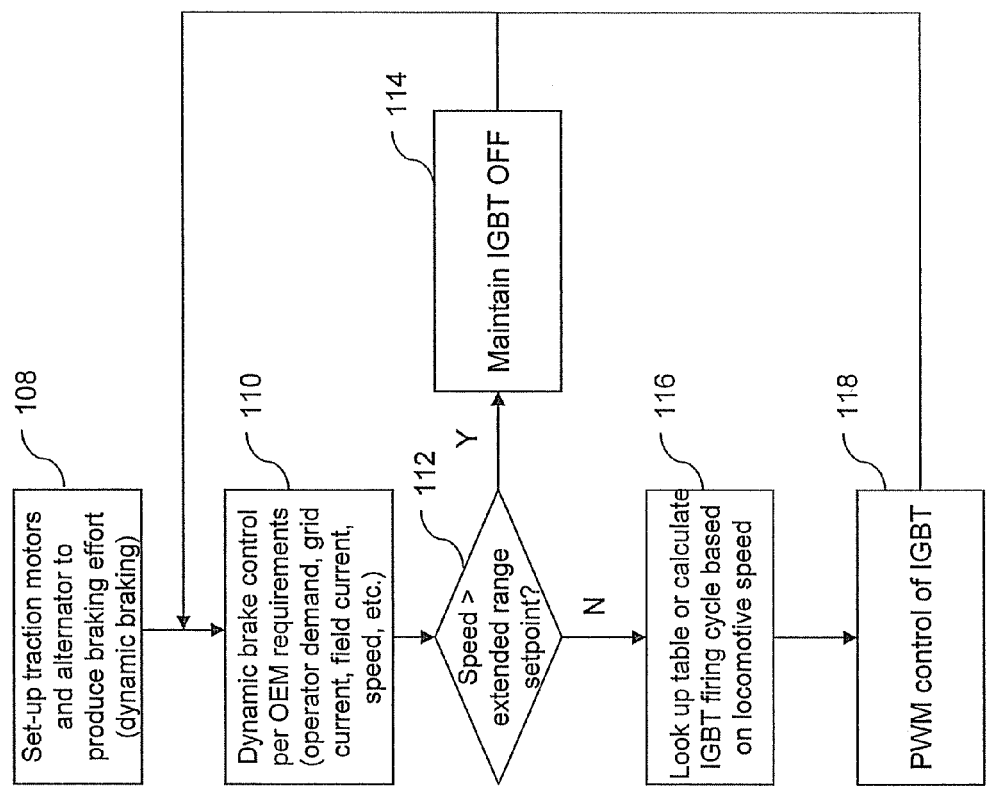
FIG. 14 is a flow chart illustrating an example set of computer executable operations that may be performed by a locomotive control system in operating an extended range dynamic braking system using a single solid state device.

FIG. 14 illustrates an example of a control algorithm that may be used to control the firing schedule for the IGBT 10. The firing schedule can be derived from a table of values such as that which is shown in Table 2 in FIG. 12, e.g., by performing a computation using the computation module 16 when needed or by performing a look-up in the table 14. The firing schedule is calculated based on the current required to be diverted from the grids to increase overall braking effort. As shown in FIG. 14, once the traction motors and alternator are configured to produce braking effort using a dynamic braking system at 108, normal dynamic braking operation may occur at 110. For example, dynamic braking can proceed according to OEM requirements to account for operator demand, grid current, field current, speed, etc. The system used to monitor and control the dynamic braking may then monitor the speed of the locomotive to determine whether or not an extended range setpoint has been reached at 112. If the speed detected at 112 is greater than the setpoint, the IGBT 10 is maintained in the off state at 114 and control resumes at 110. Once the speed detected at 112 is not greater than the extended range setpoint, a calculation or look-up operation is performed at 116 to determine the firing cycle to be used at 118 according to the locomotive's current speed. For example, according to Table 2 in FIG. 12, when the detected speed of the locomotive has reduced to 22 MPH, the IGBT 10 is fired at a 7% PWM.

Figure 15:
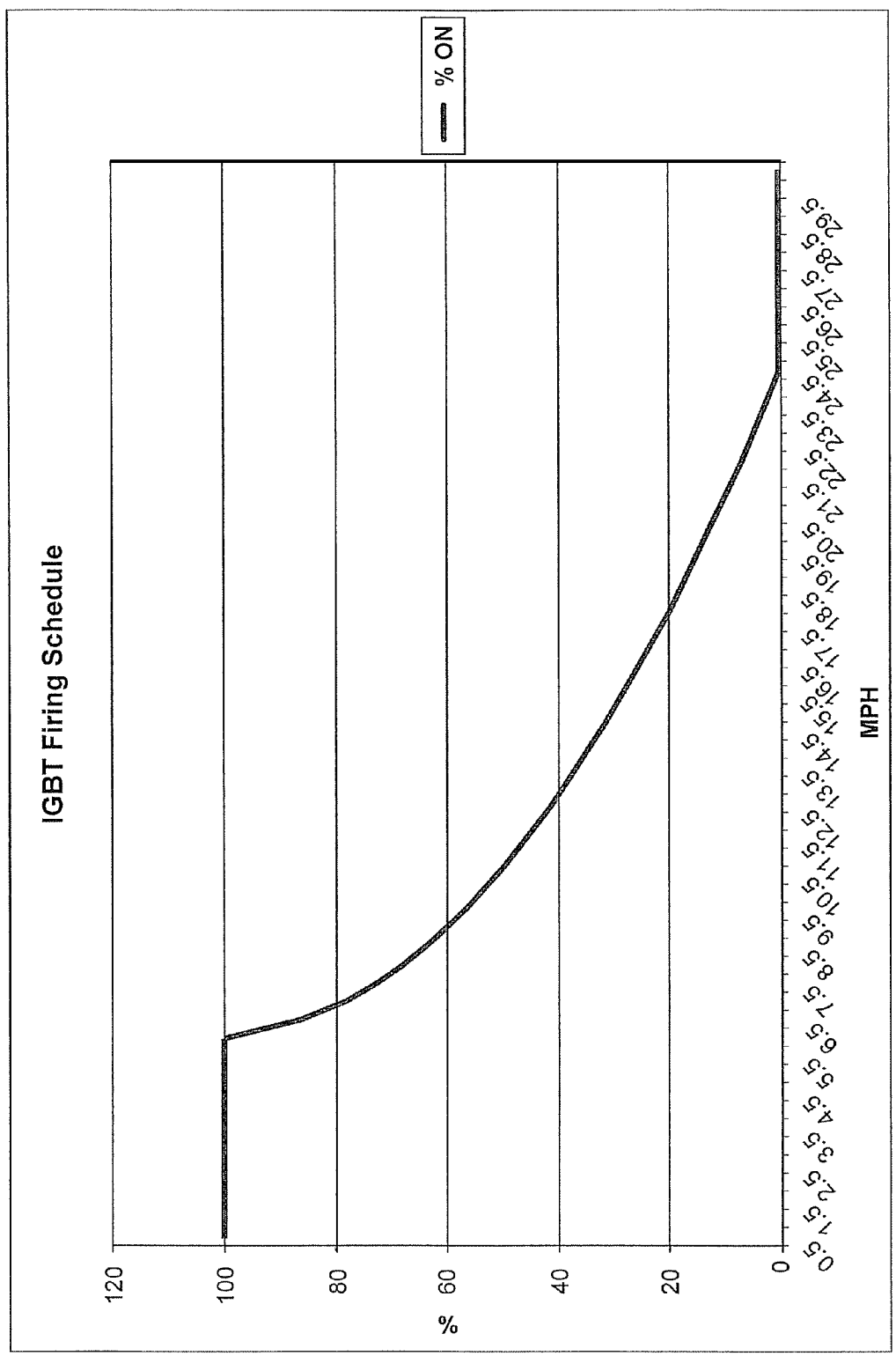
FIG. 15 is a chart illustrating the relationship between PWM cycle and speed for an IGBT firing schedule.

FIG. 15 provides a chart demonstrating the relationship between the percentage of time that the IGBT 10 is on and the speed of the locomotive as it relates to the specific model of locomotive used to obtain the data shown in Table 2 in FIG. 12.

It can be appreciated that the user of a single IGBT 10 to control the overall effective resistance of the multiple grid paths has an additional benefit of simplifying the control system required to implement the logic shown in FIG. 14. It may be noted that when using a single component, the component used needs to be capable of handling the high currents from all of the traction motors. As such, alternatively, smaller IGBTs 10 placed across each grid current branch can be used.

In an enhancement of what is shown in FIG. 6, it is possible to place individual IGBTs 10 across each resistor grid as shown in FIG. 16 and have the locomotive control system 12 control each IGBT 10 individually. The locomotive control system 12 in this example may also reference look up tables 14 or utilize a computation module 16 to determine the individual IGBT firing cycles. It can be appreciated that, when a wheel slides due to braking effort being higher than the friction between the wheel and the rail, the reaction of the control system is to reduce the overall traction motor field strength, thereby reducing the braking effort of every traction motor. By placing PWM control technology across each set of resistor grids and traction motor circuit, it is possible during extended range operation to correct a wheel slide by increasing the resistance of a single grid & TM set. This will result in maintaining full braking effort on 4 traction motors while correcting the wheel slide of the affected pair.

Figure 17:
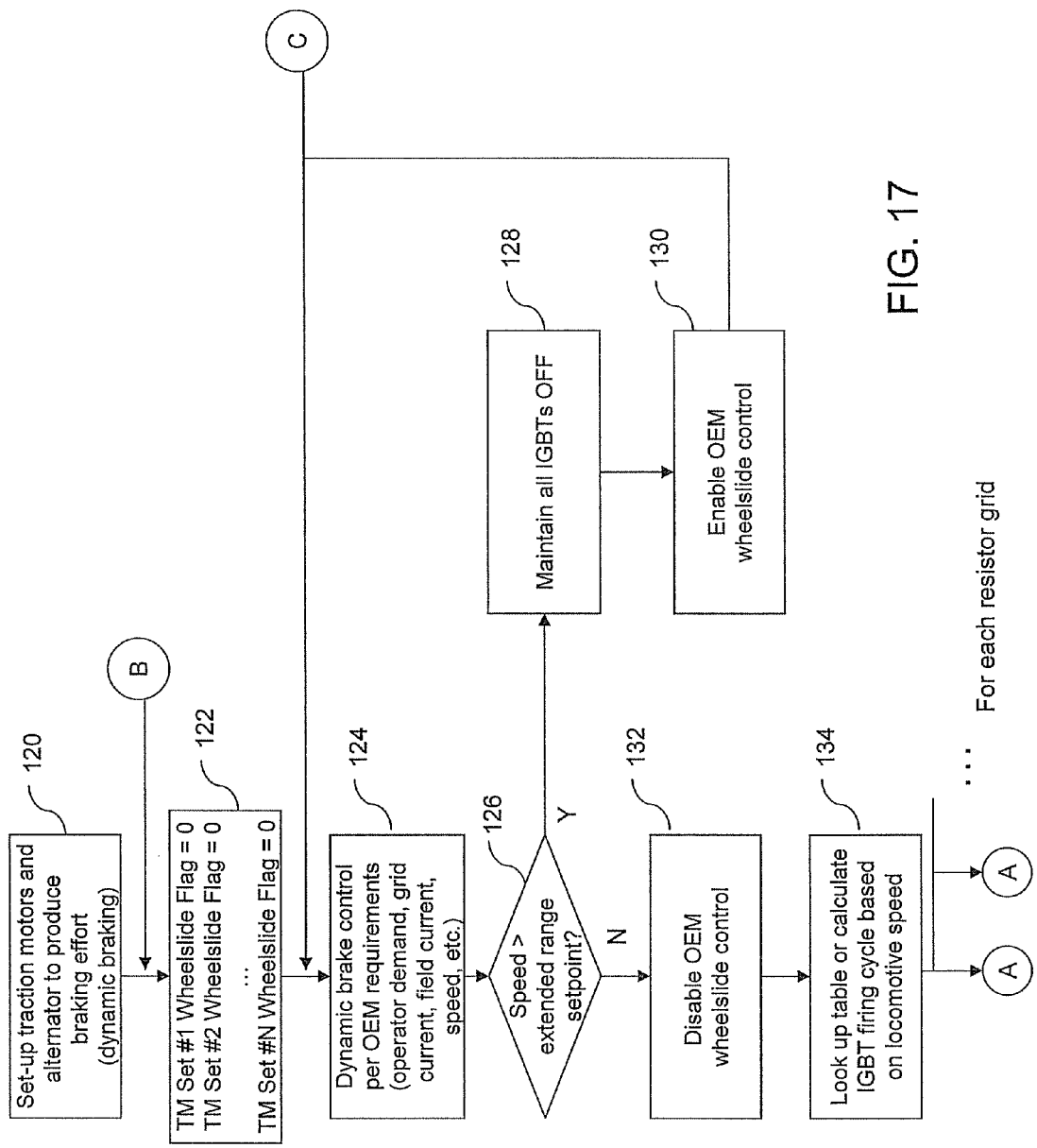
FIGS. 17 and 18 provide a flow chart illustrating an example set of computer executable operations that may be performed by a locomotive control system in operating an extended range dynamic braking system using a dedicated solid state device for each resistor grid and compensating for wheel slide.
Figure 18:
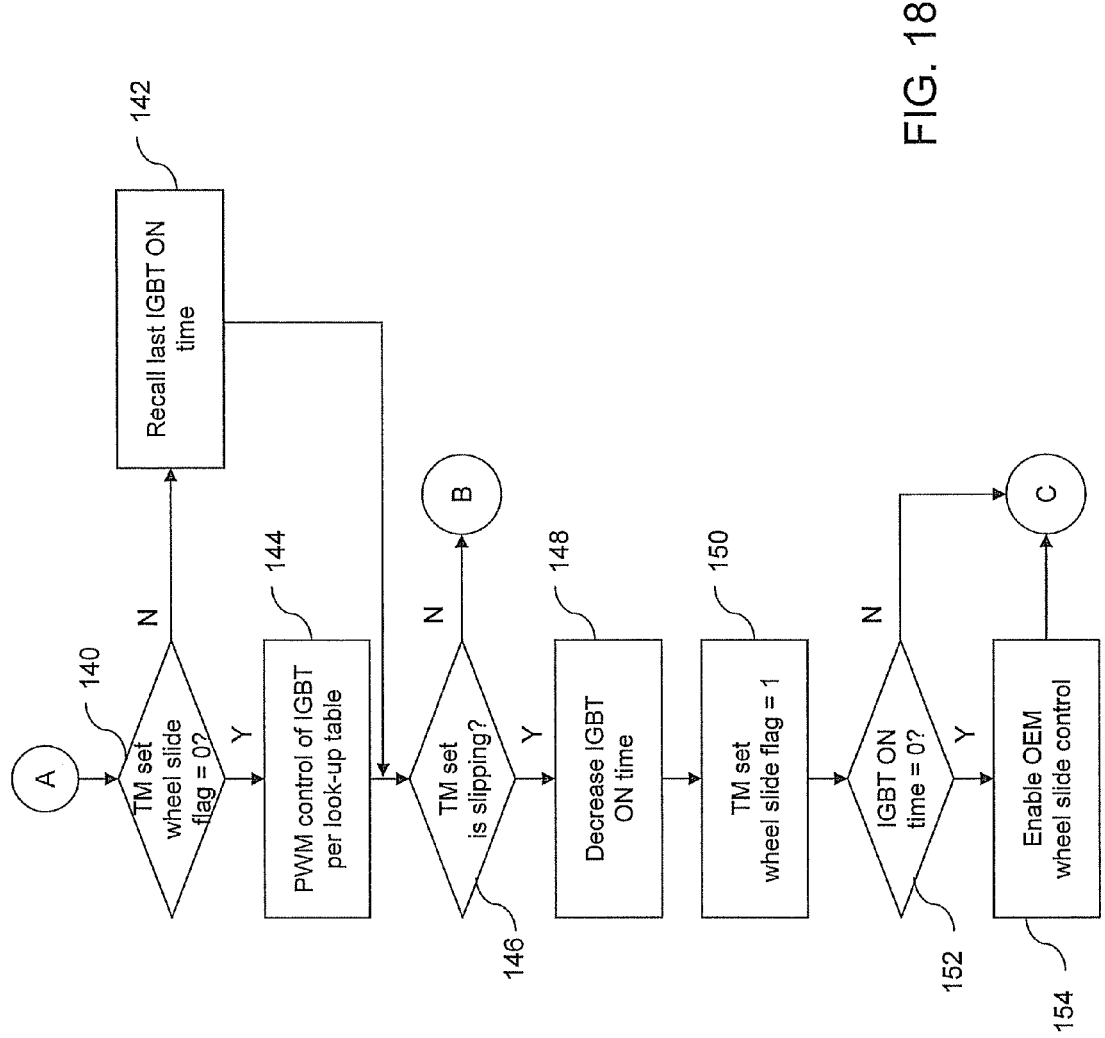

FIGS. 17 and 18 illustrate an example of an algorithm that may be employed to control the configuration shown in FIG. 16 to compensate for wheel slide. The traction motors and alternator are configured to produce braking effort using a dynamic braking system at 120, and wheel slide flags for each traction motor set to 0 at 122. Normal dynamic braking operation may then occur at 124. For example, dynamic braking can proceed according to OEM requirements to account for operator demand, grid current, field current, speed, etc. The locomotive control system 12 used to monitor and control the dynamic braking may then monitor the speed of the locomotive to determine whether or not an extended range setpoint has been reached at 126. If the speed detected at 126 is greater than the setpoint, all IGBTs 10 are maintained in the off state at 128, an OEM wheel slide control system is enabled at 130, and control resumes at 124.

Once the speed detected at 126 is not greater than the extended range setpoint, the OEM wheel slide control system is disabled at 132, and a calculation or look-up operation is performed at 134 to determine the firing cycle according to the locomotive's current speed. Control then proceeds to path A, shown in FIG. 18, for each resistor grid and corresponding traction motor set.

Turning now to FIG. 18, at 140 the control system 12 determines if the flag for that traction motor set is equal to 0. If the flag for the traction motor set is equal to zero, the PWM of the IGBT 10 is controlled at 144 according to the look-up table referenced at 134 (see above). The controller then determines at 146 whether or not the traction motors are sliding on the rails. This can be done a number of ways. Examples commonly employed include analyzing the electrical characteristics of the traction motors, monitoring speed sensors on the wheel of the locomotive or monitoring speed sensors on the armature of the traction motor. If no wheelslide is identified, control returns to 122 in FIG. 17 by following path B. If the traction motors are determined to be sliding, the IGBT on time for this specific grid resistor is decreased at 148. The amount of decrease is a function of the severity of the wheel slide and the specific characteristics of the locomotive's traction system. The wheel slide flag for this traction motor set is set to 1 at 150. The controller then determines at 152 whether or not the on time for the IGBT 10 of that resistor grid has reached zero. The purpose is to establish that there is further room for corrective action. If IGBT ON time is "0", there can be no further action taken by this IGBT to correct the wheelslide and the OEM wheelslide control is enabled. If the IGBT is ON for any length of time, it is possible to initiate further corrective action using the IGBT. Either way, control returns to 124 in FIG. 17 by following path C. The OEM system has an opportunity to control the dynamic braking system based on original design, including operator demand, grid current, etc. If the OEM wheelslide protection has been enabled, it will now reduce traction motor field excitation per its original design parameters. If not, the sequence will continue as previously described and move onto step 140 in FIG. 18. This time, since the wheelslide flag is 1, logic flows to step 142, where the previous IGBT ON time is remembered. The next step returns to the main logic flow at 146 to determine if the wheelslide continues to exist. If the wheelslide has been corrected the next step is to 122 in FIG. 17. Here, the wheelslide flag is set back to "0". If the wheels continue to slide, there is a further reduction of the IGBT ON time. The logic process is then repeated.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the locomotive control system 12 (or other computing or control device that utilizes similar principles) or accessible or connectable thereto. Any application or module herein described may be implemented using computer readable/executable instructions that may be stored or otherwise held by such computer readable media.

Although the above principles have been described with reference to certain specific embodiments, various modifications thereof will be apparent to those skilled in the art without departing from the scope of the claims appended hereto.

The invention claimed is:

1. A method for controlling a locomotive, the method comprising:
    detecting a change in speed of the locomotive during dynamic braking;
    energizing at least one solid state device connected across one or more grid resistors for a first predetermined amount of time to divert current away from the one or more grid resistors for the first predetermined amount of time; and
    de-energizing the solid state device after the first predetermined amount of time.

2. The method of claim 1, further comprising:
  detecting one or more additional changes in speed of the locomotive during dynamic braking; and
  for each additional change in speed, energizing the solid state device for a respective amount of time, wherein each respective amount of time changes incrementally.

3. The method of claim 1, wherein the solid state device is an Isolated Gate Bipolar Transistor (IGBT).

4. The method of claim 1, wherein a plurality of solid state devices are coupled to respective traction motors and grid resistors, the method further comprising energizing each solid state device individually during dynamic braking.

5. The method of claim 4, wherein the plurality of solid state devices are used to individually control wheelslide by increasing resistance across a respective grid thereby lowering braking effort generated by the respective traction motor.

6. The method of claim 1, wherein the detected change in speed corresponds to a decrease in speed as the locomotive slows down, or an increase in speed as the locomotive gains speed.

7. The method of claim 2, wherein the detected changes in speed correspond to decreases in speed as the locomotive slows down, or increases in speed as the locomotive gains speed.

8. A non-transitory computer readable medium comprising computer executable instructions for controlling a locomotive, the computer executable instructions comprising instructions for:
  detecting a change in speed of the locomotive during dynamic braking;
  energizing at least one solid state device connected across one or more grid resistors for a first predetermined amount of time to divert current away from the one or more grid resistors for the first predetermined amount of time; and
  de-energizing the solid state device after the first predetermined amount of time.

9. The non-transitory computer readable medium of claim 8, further comprising instructions for:
  detecting one or more additional changes in speed of the locomotive during dynamic braking; and
  for each additional change in speed, energizing the solid state device for a respective amount of time, wherein each respective amount of time changes incrementally.

10. The non-transitory computer readable medium of claim 8, wherein the solid state device is an Isolated Gate Bipolar Transistor (IGBT).

11. The non-transitory computer readable medium of claim 8, wherein a plurality of solid state devices are coupled to respective traction motors and grid resistors, the computer readable medium further comprising instructions for energizing each solid state device individually during dynamic braking.

12. The non-transitory computer readable medium of claim 11, wherein the plurality of solid state devices are used to individually control wheelslide by increasing resistance across a respective grid thereby lowering braking effort generated by the respective traction motor.

13. The non-transitory computer readable medium of claim 8, wherein the detected change in speed corresponds to a decrease in speed as the locomotive slows down, or an increase in speed as the locomotive gains speed.

14. The non-transitory computer readable medium of claim 9, wherein the detected changes in speed correspond to decreases in speed as the locomotive slows down, or increases in speed as the locomotive gains speed.

15. A locomotive control system for controlling a locomotive, the system comprising:
  a processor and memory, the memory storing computer executable instructions that when executed by the processor operate the locomotive control system by:
  detecting a change in speed of the locomotive during dynamic braking;
  energizing at least one solid state device connected across one or more grid resistors for a first predetermined amount of time to divert current away from the one or more grid resistors for the first predetermined amount of time; and
  de-energizing the solid state device after the first predetermined amount of time.

16. The locomotive control system of claim 15, further comprising instructions for:
  detecting one or more additional changes in speed of the locomotive during dynamic braking; and
  for each additional change in speed, energizing the solid state device for a respective amount of time, wherein each respective amount of time changes incrementally.

17. The locomotive control system of claim 15, wherein the solid state device is an Isolated Gate Bipolar Transistor (IGBT).

18. The locomotive control system of claim 15, wherein a plurality of solid state devices are coupled to respective traction motors and grid resistors, the memory further comprising instructions for energizing each solid state device individually during dynamic braking.

19. The locomotive control system of claim 18, wherein the plurality of solid state devices are used to individually control wheelslide by increasing resistance across a respective grid thereby lowering braking effort generated by the respective traction motor.

20. The locomotive control system of claim 15, wherein the detected change in speed corresponds to a decrease in speed as the locomotive slows down, or an increase in speed as the locomotive gains speed.

21. The locomotive control system of claim 16, wherein the detected changes in speed correspond to decreases in speed as the locomotive slows down, or increases in speed as the locomotive gains speed.

22. The method of claim 1, wherein the locomotive comprises at least one direct current (DC) traction motor.

23. The non-transitory computer readable medium of claim 8, wherein the locomotive comprises at least one direct current (DC) traction motor.

24. The locomotive control system of claim 15, wherein the locomotive comprises at least one direct current (DC) traction motor.

* * * * *